March 14, 1933.    O. C. HOFFMAN    1,901,030
REGISTERING BANK
Filed May 26, 1928    6 Sheets-Sheet 1
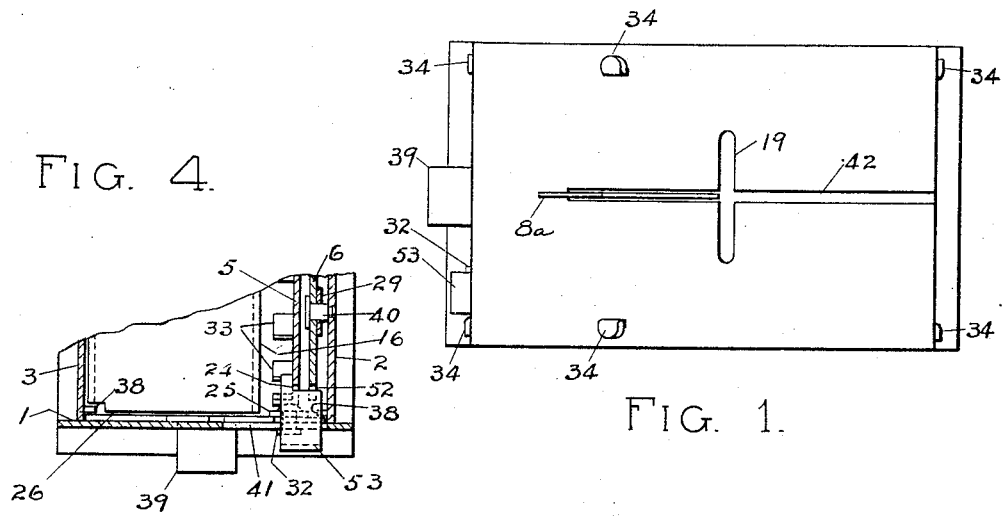
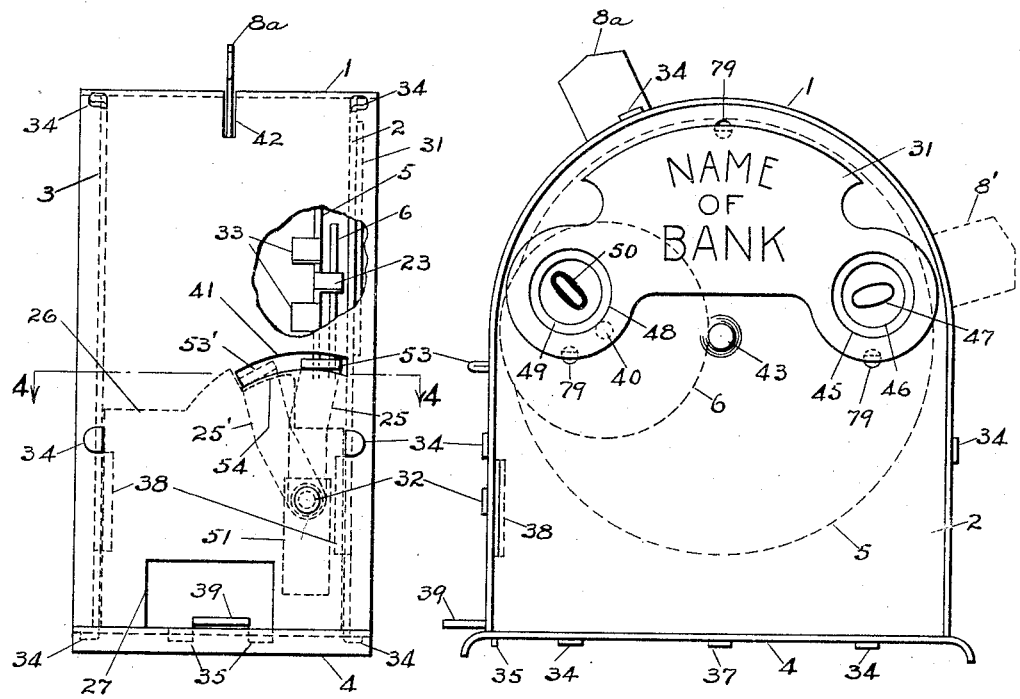
WITNESSES.  
INVENTOR  
Otto C. Hoffman.  
BY  
ATTORNEY.

March 14, 1933.    O. C. HOFFMAN    1,901,030
REGISTERING BANK
Filed May 26, 1928    6 Sheets-Sheet 2
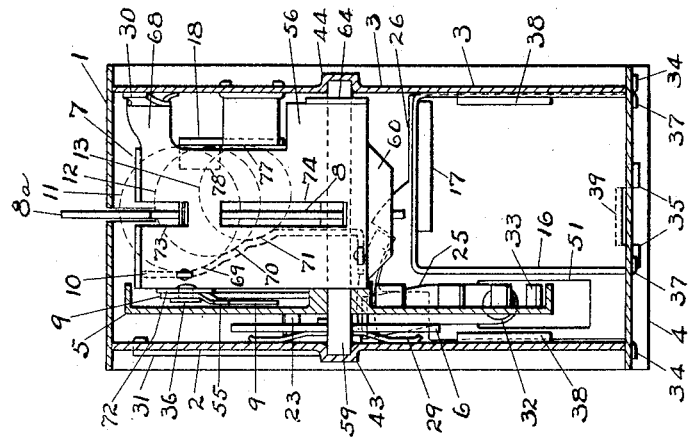
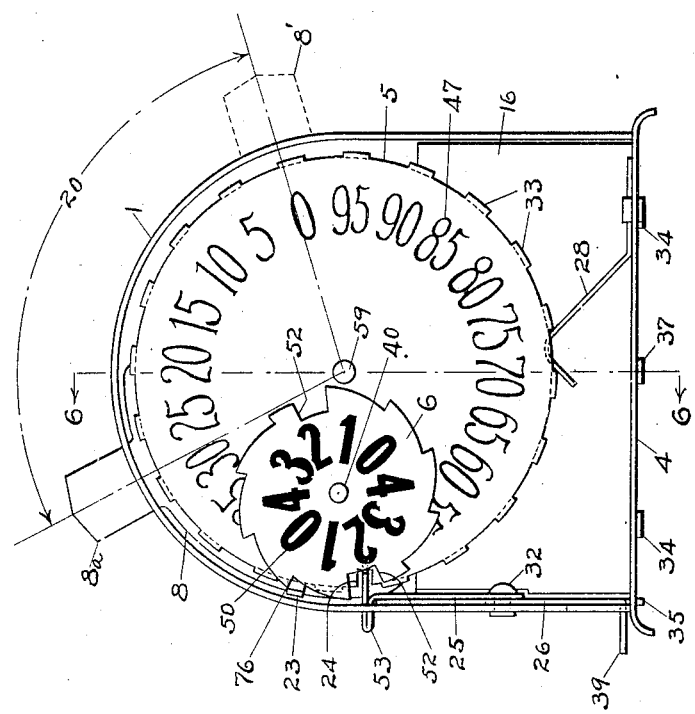
WITNESSES
INVENTOR
Otto C. Hoffman.
BY
ATTORNEY March 14, 1933.   O. C. HOFFMAN   1,901,030
REGISTERING BANK
Filed May 26, 1928   6 Sheets-Sheet 3
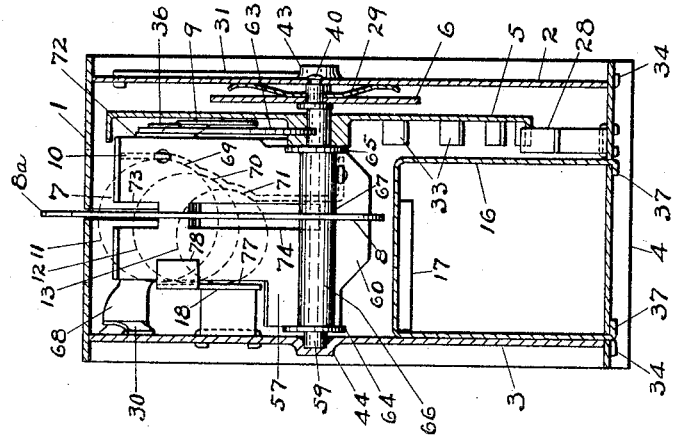
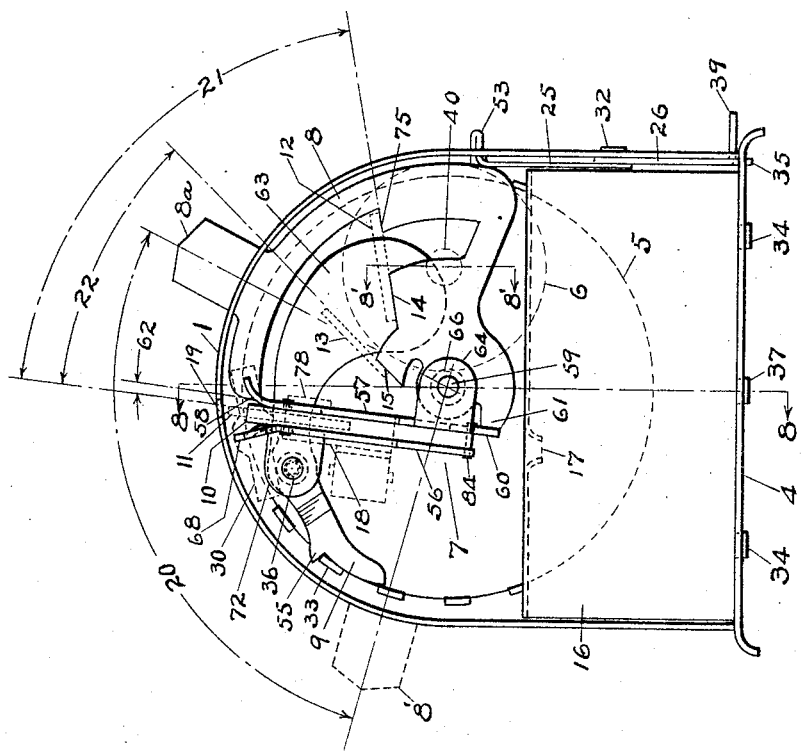
WITNESSES
INVENTOR
Otto C. Hoffman.
ATTORNEYS March 14, 1933.  O. C. HOFFMAN  1,901,030
REGISTERING BANK
Filed May 26, 1928  6 Sheets-Sheet 4
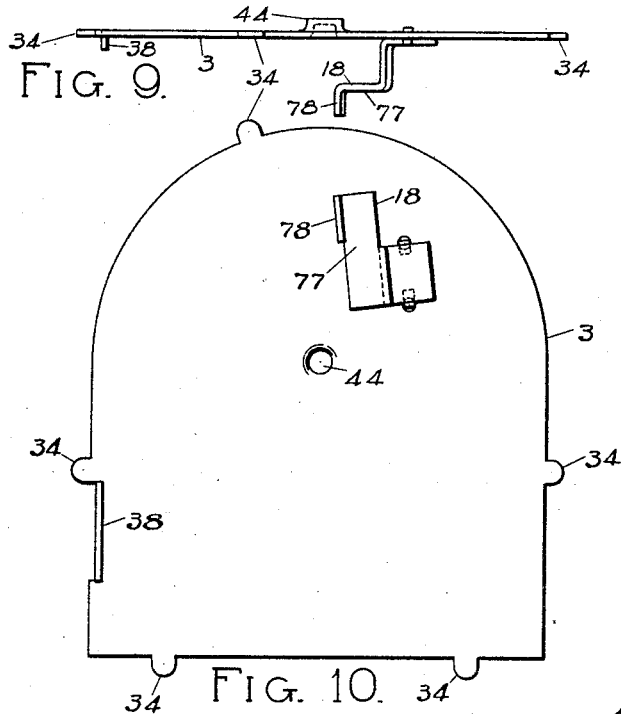
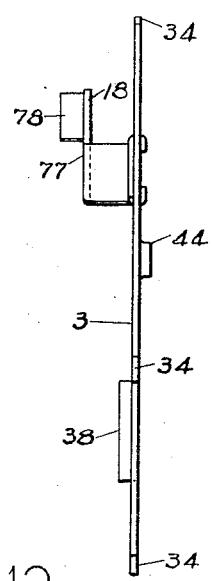
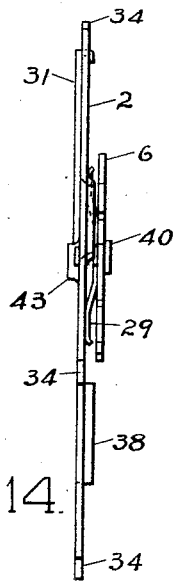
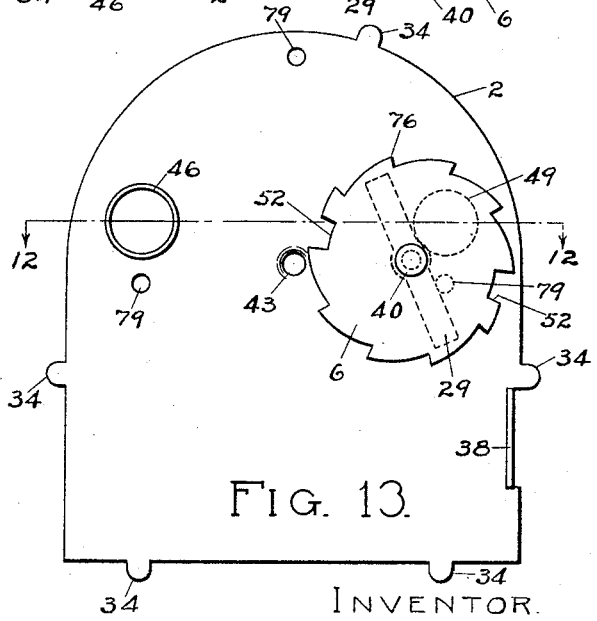

March 14, 1933.　　　O. C. HOFFMAN　　　1,901,030
REGISTERING BANK
Filed May 26, 1928　　　6 Sheets-Sheet 5
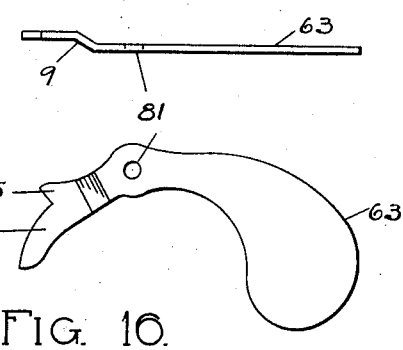
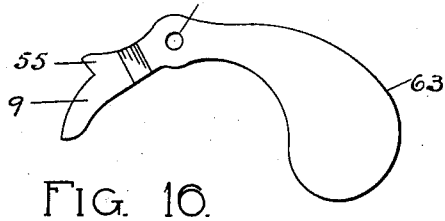
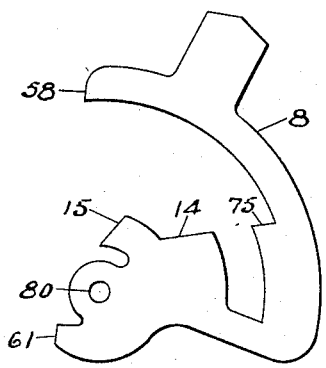
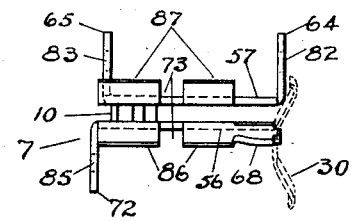
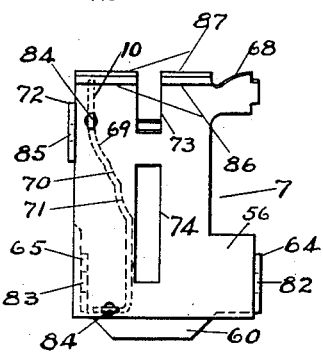
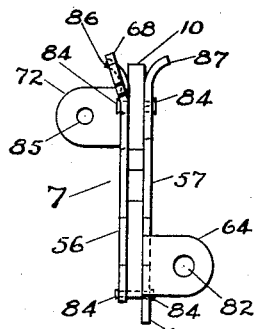
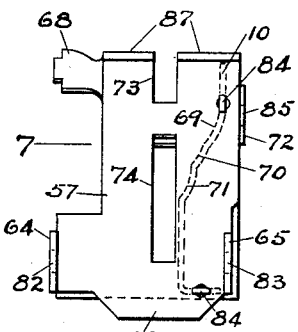
WITNESSES
INVENTOR
Otto C. Hoffman
BY
ATTORNEY March 14, 1933.　　　O. C. HOFFMAN　　　1,901,030
REGISTERING BANK
Filed May 26, 1928　　　6 Sheets-Sheet 6
FIG. 23.　　FIG. 24.
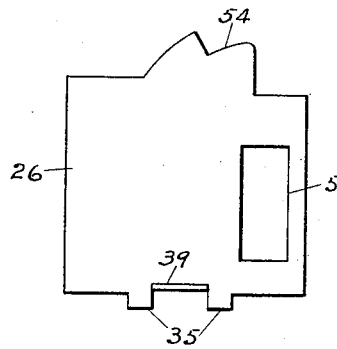
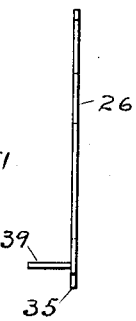
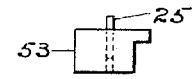
FIG. 25.
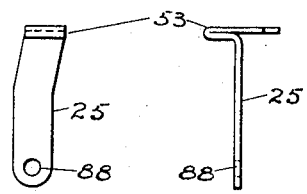
FIG. 26.　　FIG. 27.
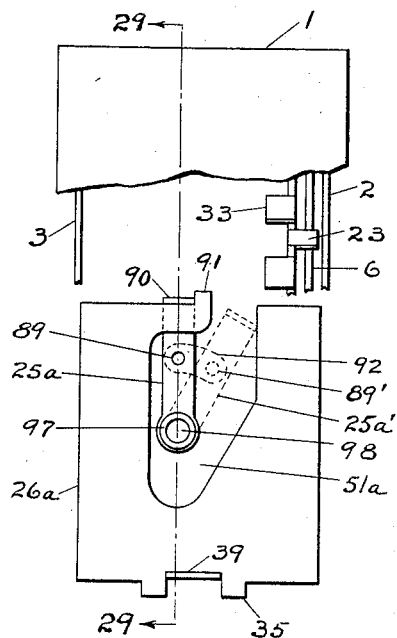
FIG. 28.
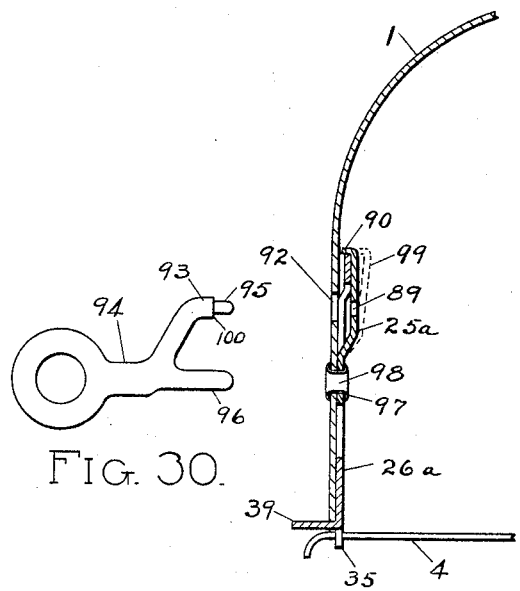
FIG. 30.　　FIG. 29.
WITNESSES
Charles B. Moulthrop
John J. Dunn
BY
INVENTOR
Otto C. Hoffman.
Lucian E. Jackson
ATTORNEY.

Patented Mar. 14, 1933

1,901,030

UNITED STATES PATENT OFFICE

OTTO C. HOFFMAN, OF BUFFALO, NEW YORK, ASSIGNOR OF ONE-HALF TO JOHN J. DUNN, OF BUFFALO, NEW YORK

REGISTERING BANK

Application filed May 26, 1928. Serial No. 280,867.

This invention relates to coin banks of the self-registering variety and for coins such as nickels, dimes and quarters, in which the coins of the larger denomination are multiples of the others.

The main object of the invention is to provide a self-registering bank in which the registering mechanism is automatically operated by the coin and its carrier when propelled by a coin lever, and in which no coin can be removed until the entire sum has been deposited for which the bank has been designed to receive and register.

Another object is to provide means whereby the inserted coin cannot drop into the coin box until said coin and its carrier are manipulated by said coin lever and such manipulation automatically registers the value of said coin, and whereby the release of said coin and the return of said carrier allows said coin to be deposited in said coin box.

Another object is to provide a form of construction consisting of few parts and preferably employing sheet metal, whereby the device can be made quickly and in large quantities, with the minimum amount of skilled labor expended thereon.

The invention comprises two registering dials, one to register the amount in cents of the successive deposits of the different coins as deposited and the other dial operated to move one space at each complete revolution of the first dial and so register the dollars deposited. The cents dial is divided into twenty spaces to register the cents in multiples of five and the dollar dial is divided into ten spaces to register $5.00 repeated. The dollar dial could also be marked to register $10.00.

The device also consists in the combination and arrangement of the various parts and construction of details as shown in the accompanying drawings and as hereinafter described and specifically pointed out in the claims.

In the accompanying drawings, Figure 1 is a top or plan view showing the coin and lever operating slots. Fig. 2 is a front elevation showing the dollar and cents registering openings. Fig. 3 is a side elevation showing the coin box door release lever and door opening for removing the accumulated coins and partly in section to expose a portion of the dials. Fig. 4 is a portion of a sectional plan of the device on the line 4—4 of Fig. 3 showing the position of the release lever in relation to the two dials when the total amount has been deposited so the bank can be opened. Fig. 5 is a front elevation with the front plate of the bank removed to expose the registering dials. Fig. 6 is a side elevation partly sectional on the line 6—6 of Fig. 5 and partly with the cover removed to show the coin box and coin carrier. Fig. 7 is a rear elevation with the rear plate removed. Fig. 8 is a side elevation partly in section on line 8—8 and partly in section on line 8'—8' of Fig. 7. Figs. 9, 10 and 11 are plan, inside elevation and end elevation respectively of the back plate of the bank. Figs. 12, 13 and 14 are sectional plan on line 12—12 of Fig. 13, elevation and end elevation respectively, of the front plate of the bank. Figs. 15 and 16 are plan and side elevation of the pawl on the coin carrier for operating the cents dial. Figs. 17 and 18 are plan and side elevation of the lever for operating the coin carrier. Figs. 19 and 20 are plan and one side elevation of the coin carrier while Figs. 21 and 22 are edge and the other side elevation of the coin carrier. Figs. 23 and 24 are front and edge views of the door for emptying the coin box. Figs. 25, 26 and 27 are top, front and edge views of the release lever which locks the door to the coin box and releases said door only when the two dials register the full amount of deposit for which the bank is designed. Fig. 28 is a side elevation, similar to Fig. 3, with the bank partly in section to show an alternative construction of the door for closing the coin box and also an alternative construction of the release lever for said door. Fig. 29 is a sectional elevation of a portion of the bank on line 29—29 of Fig. 28 to illustrate the alternative construction of the door and release lever shown in Fig. 28. Fig. 30 is a key for operating the lever to release the door shown in Figs. 28 and 29.

In the Figures, 1 is the cover forming the sides of the bank and curved into a semicircular shape for the top. 2 is a plate forming the front and 3 a plate forming the back of said bank and having lugs 34 (shown in the details of said plates in Figs. 9–14) on the sides and tops to fit into and fasten said cover 1, and lugs 34 on the bottom to fit into and fasten to the base 4 by being bent as shown in Figs. 1 to 8. The front 2 and back 3 are pressed out to form end bearings 43 and 44 respectively for the shaft 59 which supports the larger or cents dial 5 and the coin carrier 7. Shaft 59 is stationary and the large dial 5 rotatively mounted thereon while the coin carrier 7 is movably mounted on said shaft 59 by means of bosses 64 and 65. The coin carrier 7 is made up of two plates 56 (Fig. 6) and 57 (Fig. 8) and held together and spaced apart by means of a spacer 10 (Figs. 6–8) having lugs 84 shown more in detail in Figs. 19–22.

The large dial 5 having a circular line of twenty figures 47 from 0 to 95 (Fig. 5) has twenty teeth 33 extending to the rear. Teeth 33 (Fig. 7) are operated upon by the finger 55 on pawl 9 to move the dial 5 when a coin (as 11) is in carrier 7 and lever 8 is moved through arc 20 from 8a to 8′. Slot 42 for movement of lever 8 is shown in Fig. 1 and also a slot 19 for inserting the different coins. Figs. 6 and 8 show coins 11, 12 and 13 dotted and in the positions they occupy in the coin carrier 7 when dropped into slot 19. 11 represents a 25 cent piece, 12 represents a 5 cent piece and 13 represents a 10 cent piece. Coin 11 when dropped into slot 19 is held between a straight surface 77 on a plate 18 and a curved surface 69 on spacer 10. Curved surface 69 is an arc of a circle equal to the circumference of a 25 cent coin. Coin 12, or a 5 cent piece, is held between surface 77 and the arc 70 while coin 13 (a ten cent piece) is held between surface 77 and arc 71. 70 and 71 are arcs conforming to the shapes of the 5 and 10 cent coins respectively.

The pawl 9 shown in detail in Figs. 15 and 16 has a finger 55 to engage the teeth 33 of the dial 5 and move said dial in one direction, i. e. from 8a to 8′ through arc 20 (Fig. 7) but to run free when moved from 8′ to 8a. 81 (Figs. 15 and 16) is a hole in pawl 9 by which said pawl is pivoted on pin 36 of the boss 72 on plate 56 (Fig. 19). 63 on pawl 9 is formed to make a counterweight and so hold the finger 55 in contact with the teeth 33 of dial 5. Referring to Figs. 17 and 18 the lever 8 is shown as having a hole 80 by which it is movably mounted on shaft 59 (Fig. 7). 58 (Fig. 18) on lever 8 is a surface to contact with a 25 cent coin 11 (Fig. 7) when first moved through the arc 62. Surface 15 of lever 8 (Fig. 18) is adapted to contact with 10 cent coin 13 and surfaces 14 and 75 are adapted to contact with 5 cent coin 12. The relative positions of coins 13 and 12 when contacting with said surfaces 15 and 14 and 75 are shown by the dotted figures 13 and 12 in Fig. 7. The coins 13 and 12 it will be understood are not in the dotted positions shown in Fig. 7 but are in the coin carrier 7 and contact with said surfaces 15 and 14 and 75 when the lever 8 is moved through the arcs 22 or 21 respectively.

Normally the different parts of the bank are in the positions shown in Fig. 7, when a coin can be inserted in the coin slot 19. Below the coin carrier 7 is a slot 17 in a coin box 16 for receiving the coins from said coin carrier. Coin box 16 is fastened to base 4 by lugs 37.

A plate 18 having a surface 77 for holding the coins in the coin carrier 7 is fastened to the inside of the back 3 (shown in detail in Figs. 9–11) and its position indicated by dotted lines in Fig. 7 as in this figure the said back plate 3 is removed. 78 on said plate 18 is a stop against which coin carrier 7 rests when in normal position (Fig. 7) below coin slot 19. Spring 30 on the arm 68 of coin carrier 7 (Figs. 6, 8 and dotted in Figs. 7 and 19) makes friction contact against the inside of back 3 to hold said coin carrier 7 in the position it is placed by the lever 8. Referring to Fig. 7, coin carrier 7 is moved to the left by lever 8 contacting with a coin in said 7 when moved from 8a to 8′ through arc 20, and moved back to the right to the normal position shown, by the surface 61 contacting with the lower extension 60 on plate 57 of the carrier 7 when lever 8 is moved from 8′ to 8a.

The coin carrier 7 shown in detail in Figs. 19–22, as before stated, is made up of two plates 56 and 57 and spaced apart and fastened together by lugs 84 on spacer 10. Plate 57 is turned back to form two bosses 64 and 65 with holes 82 and 83 for being movably mounted on shaft 59. Plate 56 has a boss 72 with a hole 85 for the pin 36 on which is pivoted the pawl 9. The upper ends of plates 56 and 57 are curved as shown at 86 and 87 to direct a coin between said plates when inserted into the slot 19 in the top of the bank. The plates 56 and 57 are slotted at 73 at the top and have a center slot 74 to allow the surfaces 58, 15, and 14 and 75 of lever 8 to contact with coins 11, 13 or 12 (Fig. 7) or to pass through without moving said carrier when no coins are in it. When a coin is in carrier 7 the lever 8 acting on said coin moves the coin carrier 7, the pawl 9 and dial 5 to register the amount of said coin, said registration being indicated by one of the line of figures 47 on dial 5 (Fig. 5) showing through opening 46 in the front 2 of the bank (Fig. 2).

The contacting of the surfaces 58, 14 and 75 or 15 of the lever 8 with a coin 11, 12 or 13 in the coin carrier 7 holds said coin in its position in 7 until said lever 8 reaches position 8′ or the bottom of the slot 42. Moving the lever 8 back toward 8a from 8' releases the coin which can then drop down through to the bottom of the carrier 7 as said coin has passed the confining surface 77 of plate 18. When the coin carrier 7 has been returned to the position shown in Fig. 7 the coin which is held between plates 56 and 57 in the bottom of the carrier 7 with its lower edge on top of coin box 16, drops through the slot 17 into said box 16. When a 25 cent coin 11 is inserted in slot 19 to the coin carrier 7 and the lever 8 moved from 8a to 8' the dial 5 has been moved through a distance equal to five spaces or five of the figures on the front of said dial. When a 5 cent coin 12 is inserted in coin carrier 7, lever 8 moves an arc represented as 21 (Fig. 7) which is equal to four spaces or four of the figures on the front of the dial 5 before contacting with said coin 12 and further movement of lever 8 to 8' registers one figure on dial 5. When a 10 cent coin 13 is inserted in coin carrier 7, lever 8 moves an arc represented by 22 which is equal to three spaces or three figures on dial 5 before contacting with said coin 13 and further movement of lever 8 to 8' registers two figures on dial 5.

The lever 8 is located on shaft 59 and in line with the slots 73 and 74 of the coin carrier 7 by the distance pieces of tubing 66 and 67.

Referring to Figs. 12, 13 and 14, the dollar dial 6 is shown rotatably mounted on a pin 40 and having ten teeth 76 to correspond to the curved line 50 of ten figures shown on its face in Fig. 5. The two notches 52 in dial 6 are for the purpose of allowing horizontal portion 53 of release lever 25 to enter through notch 24 of dial 5 twice in each revolution of said dial 6 when said notches are in line upon depositing the total sum required. (Figs. 3–5). The finger 23 (Figs. 3, 5) on dial 5 contacts with one of the teeth 76 on dial 6 and moves said dial 6 one-tenth of a revolution at each complete revolution of said dial 5, thus registering the dollars deposited. Said registration is indicated by one of the line of figures 50 on dial 6 (Fig. 5) showing through opening 49 in the front 2 of the bank (Fig. 2). The dial 6 is frictionally held from moving by the spring 29 mounted on pin 40 and contacting with said dial 6 and the front 2. Spring 28 contacts with teeth 33 of dial 5 to frictionally hold said dial 5.

Holes 79 in front 2 (Figs. 2 and 13) are for the purpose of holding the name plate 31. Name plate 31 has openings 45 and 48 corresponding to the openings 46 and 49 of the front 2.

The front 2 and back 3 each have a lip turned in at 38 (Figs. 2–4, 6, 9–14) to form guides for the sliding door 26 which controls the opening 27 used in emptying the coin box 16. Sliding door 26 (Figs. 3–5, 23, 24) has a lip 39 turned out at right angles as a handle to lift same and an opening 51 to allow for said movement in relation to the pin 32 which serves to pivot the release lever 25 by means of hole 88 (Fig. 26). In the position of lever 25 in Figs. 3–5 its top 53 is shown in the notches 24 and 52 allowing the raising of door 26, and emptying of coin box 16. At this time the dials 5 and 6 cannot be moved and no coins can be registered as the lever 8 cannot move the carrier 7 with a coin in it. When lever 25 is moved out of notches 24 and 52 and the position represented by 25' with the top 53 shown at 53', the dials 5 and 6 are free to be rotated and the door 26 is prevented from being opened by its surface 54 contacting with the top at 53'.

Slot 41 in cover 1 allows for the movement of top 53 of lever 25. The door 26 has lugs 35 at the bottom for extending through the base 4.

An alternative arrangement of door and releasing lever which can only be operated by the use of a key is shown in Figs. 28, 29 and 30. The door is designated as 26a with an opening 51a near its center to clear the eyelet 97 which forms a pivot for the release lever 25a. A stop 91 on 26a and lug 90 on lever 25a cooperate to prevent the raising of door 26a. Key 94 has a straight central pivot portion 96 adapted to enter the hole 98 in eyelet 97 while the point 95 on offset arm 93 is inserted in hole 89 of lever 25a. Pushing pivot 96 of key 94 through hole 98, point 95 enters hole 89 and further movement presses shoulder 100 against 25a until it springs the lever 25a to the dotted position 99 when the lug 90 clears the stop 91 and the lever 25a can be moved to 25a' by rotating key 94 on its pivot 96. The door 26a can then be raised to empty the coin coin box 16. 92 is a slot in the cover 1 to allow the movement of the key arm 93 so hole 89 is moved to 89'.

Having thus described my invention what I claim as new and desire to secure by Letters Patent is:

1. In a self-registering bank adapted to register coins of several denominations and having a casing with a single deposit opening therein for all the different coins, a coin carrier, a registering dial, a coin box having a coin slot beneath said carrier, and an oscillating lever adapted to engage and retain a coin in its initial position in said carrier to oscillate said carrier in one direction to register said coin on said dial and to release said coin and oscillate said carrier in the opposite direction whereby said coin may be dropped through the slot of said coin box.

2. In a self-registering bank adapted to register coins of several denominations and having a casing with a single deposit opening therethrough, the combination of a registering dial, a coin box having a coin slot, a coin carrier with means for directly engaging and moving said dial, said coin carrier having a coin passage extending from top to bottom therethrough with its inlet opening beneath the casing opening in its initial position and adapted to retain a coin in a predetermined position when the carrier is in its initial position and with its outlet opening directly above the coin box slot into which said coin is free to drop only on the return movement of said carrier to its initial position and lever means to oscillate said carrier in one direction by contacting with said coin until its value is registered on said dial and a surface on said lever means to oscillate said carrier to its initial position.

3. In a self registering bank adapted to register coins of several denominations, the combination of a registering device, an oscillating coin carrier spring friction means on said carrier, means between said registering device and said carrier to operate said registering device when said carrier is oscillated, surfaces in said carrier to hold coins of different denominations in their respective positions and a pivoted oscillating lever with separate surfaces above its pivot for engaging coins of different denominations and oscillating said coin carrier to register the value of the coins deposited, said lever having a separate surface below its pivot for engaging and returning said carrier to its normal coin receiving position.

4. In a self-registering bank adapted to register coins of several denominations, in combination, a toothed numeral dial, a coin carrier, a lever with separately disposed surfaces for engaging coins of different denominations, a shaft on which said dial, coin carrier and lever are mounted, said coin carrier having different surfaces for holding different sized coins and being slotted to allow for movement of said lever therethrough, a pawl pivoted on said carrier to directly engage the teeth of said dial and move said dial in one direction only to register the value of the different coins depending on the portion of the total movement of said lever in which said lever is in contact with a coin and means on said lever to return said coin carrier to its normal position on the return movement of said lever.

OTTO C. HOFFMAN.